US005493812A

United States Patent [19]

Teich

[11] Patent Number: 5,493,812

[45] Date of Patent: Feb. 27, 1996

[54] GARAGE DOOR OPENER WITH REMOTE SAFETY SENSORS

[75] Inventor: Rudor Teich, South Orange, N.J.

[73] Assignee: RMT Associates, South Orange, N.J.

[21] Appl. No.: 122,236

[22] Filed: Sep. 15, 1993

[51] Int. Cl.[6] .......... E05F 15/02

[52] U.S. Cl. .......... 49/26

[58] Field of Search .......... 49/25, 26, 27, 49/28

[56] References Cited

U.S. PATENT DOCUMENTS

| | | | |
|---|---|---|---|
| 3,967,258 | 6/1976 | Bucy, Jr. | 340/258 |
| 4,092,643 | 5/1978 | Stolarczyk | 340/416 |
| 4,247,806 | 1/1981 | Mercier | 318/267 |
| 4,289,995 | 9/1981 | Sorber et al. | 49/28 X |
| 4,551,691 | 12/1985 | Kawai et al. | 49/28 X |
| 4,621,223 | 11/1986 | Murakami et al. | 49/28 X |
| 4,701,684 | 10/1987 | Seidel et al. | 49/28 X |
| 4,922,168 | 5/1990 | Waggamon et al. | 318/266 |
| 4,924,206 | 5/1990 | Ayers | 340/426 |
| 4,953,608 | 9/1990 | Larsson | 49/28 X |
| 4,972,629 | 11/1990 | Merendino et al. | 49/25 |
| 4,981,084 | 1/1991 | Templeton et al. | 49/28 X |
| 5,040,331 | 8/1991 | Merendino et al. | 49/25 |
| 5,069,000 | 12/1991 | Zuckerman | 49/28 |
| 5,115,236 | 5/1992 | Kohler | 340/825.69 |
| 5,127,190 | 7/1992 | Hein et al. | 49/28 X |
| 5,142,822 | 9/1992 | Beckerman | 49/28 X |
| 5,191,268 | 3/1993 | Duhame | 318/266 |
| 5,243,784 | 9/1993 | Whitaker et al. | 49/28 X |

*Primary Examiner*—Peter M. Cuomo
*Assistant Examiner*—Jerry Redman
*Attorney, Agent, or Firm*—Gottlieb, Rackman & Reisman

[57] ABSTRACT

A wireless safety system for a garage door opener adapted for use at least in part with an independent energy source is provided. The wireless safety system includes a control circuit for controlling movement of the garage door. An activation member provides an input to the control circuit to initiate motion of the garage door. A detecting member detects whether an obstruction is provided in the path of the garage door. The detecting member includes a first state, wherein the detection member does not detect obstructions and consumes minimal energy, and a second state wherein the detection member detects obstructions. The detection member is selectively switchable between the first state (dormant) and the second state (active) by the control circuit.

28 Claims, 3 Drawing Sheets

GARAGE DOOR OPENER WITH REMOTE SAFETY SENSORS

BACKGROUND OF THE INVENTION

This invention is generally directed to a garage door opener and, in particular, to a garage door opener having a remote safety sensor that includes a dormant state and an active state.

Electronic garage door openers have taken many forms in the prior art. As these electronic garage door openers become more common and there are more instances of injury, rules with regard thereto have been proliferated by local, state and federal lawmakers. Effective as of Jan. 1, 1993 a rule has been placed into effect that all electronic garage doors installed must be equipped with a safety device that will reverse a closing door if an obstruction is present in the last six inches of the door's travel.

Garage door safety features have taken many forms since they were first developed. For example, one of the early features developed in the garage door industry was to include a type of pressure sensing device, such that, if the garage door were in the closing process, and a pressure was exerted in a direction opposite to closing, the garage door would reverse direction (open). This device was found to be not entirely adequate because once a force was exerted in the opposite direction, a sufficient pressure may have already been exerted against the object as to cause damage. For example, if a small child were in the path of the garage door, the child could be knocked down and injured prior to the garage door reversing direction.

A second type of safety system as shown in U.S. Pat. No. 4,922,168 (Waggamon et al.) includes infrared transmitters and receivers hard wired to the motor so that if an obstacle is located between the transmitter and receiver, which necessarily means in the path of the garage door the receiver would send a signal to a motor controller to reverse direction of the garage door. This device is sufficient for its provided purpose. However, it can be quite costly and time consuming to hardwire a transmitter and receiver device to a motor controller which is located away from the transmitter and receiver. For instance, the transmitter and receiver may be located at the bottom of the tracks near the ground, while the motor controller and motor are mounted at the opposite end of the track. This placement is necessitated by the purpose of each element; the detector must sense for obstructions near the ground and the motor must provide the appropriate lifting force to lift the garage door.

Not only is the cost of wiring the device time consuming and expensive, there is the additional problem that garage doors are essentially outdoor products that require high quality and costly electrical connectors due to their contact with the elements (rain, snow, cold weather, warm weather and general dampness) associated with a garage. Furthermore, since this is a safety feature, long term reliability is a requirement. Accordingly, a commercialized product must be designed so that it is not vulnerable to moisture and the connections between the sensors and the motor controller require expensive design and installation in order to meet industry water-soak and pressure requirements. Eliminating wiring altogether would thus provide significant economical advantages.

Wireless communication systems are not new; for example, a wireless system for detecting intrusions is shown in U.S. Pat. No. 3,967,258 (Buck, Jr.). This system utilizes battery operated sensors that also incorporate a low battery sensor. This inclusion of the low battery sensor uses slightly more battery power than if the low battery sensor were not present. Accordingly, this does not help in providing increased battery life as is one of the goals of the present invention.

Accordingly, the present invention contemplates a wireless system that eliminates many of the problems associated with designing and installing hardwired garage door safety systems. However, the main problem with a wireless system (battery operated) is that wireless receivers use a substantial amount of energy. The battery life of such devices is relatively short if they are maintained in a continuously active state. To the extent that low-current receivers are available, they tend to be expensive and uneconomical for this application. Accordingly, the present invention overcomes the deficiencies in prior art hardwired system and overcomes the problems associated with a wireless system, namely limited battery life. This is accomplished by providing a low cost wireless remote system that includes a dormant state and an active state in order to minimize power consumption and maximize battery life.

SUMMARY OF THE INVENTION

Generally speaking, in accordance with the instant invention, a wireless garage door safety system is provided. The safety system is adapted for use at least in part with an independent energy source (battery). A control circuit is provided for controlling the movement of the garage door. A touch pad or remote control switch must be provided for activating the control circuit to start motion of the garage door. A detecting member, normally an infrared transmitter and receiver combination, is provided for detecting whether an obstruction moved into the path of the garage door. The detecting member is designed to be switchable between a first state, wherein the detection member does not detect obstructions and consumes minimal energy and a second state, wherein the detection member detects obstructions. In other words, a dormant state, using minimal energy and an active state. The detection member is selectively switchable from the dormant state to the active state by the control circuit.

The first embodiment of the wireless safety system includes a detection member that includes a sound sensor that senses motion of the garage door on the track system in order to wake up the detection member. An audio frequency transducer is used to translate the vibration of the track into an electric signal to wake up the detection member from the dormant state. The audio frequency transducer may be of the piezoelectric type. Once the detection member is in the active state, it transmits a signal to the control circuit wirelessly to indicate when no obstruction is located between the two ends being sensed.

A method of operating a wireless garage door opening system in order to reduce depletion of an external energy source that includes means of detecting obstructions in the path of the garage door is also provided. The system includes a control circuit, a motor and a detection member that is switchable between a first state and second state as noted above with regard to the system. The method includes a first step of activating the control circuit and a second step of transmitting a wakeup signal from the control circuit to the detection member. The detection member is then switched from the first state to the second state. This enables the detection member to sense when an obstruction is in the path of the garage door. A control signal is then transmitted from the detection member to the control circuit at predetermined intervals when no obstruction is detected. If an obstruction is detected, no control signal is transmitted to the control circuit; the garage door then ceases to close.

Accordingly, it is an object of the invention to provide a wireless safety system for a garage door that saves battery life of the detection members by providing them with two states, a dormant state, wherein no detection takes place and minimal energy is used from the battery, and a second state which is fully active.

A further object of the invention is to provide a wireless safety system for a garage door opener that is easy to install.

A still further object of the invention is to provide a safety system for a garage door opener that includes a plurality of integral parts that can all be mounted without any connections that would be exposed to the elements normally found in a garage.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, references is made to the following description taken in connection with the accompanying drawings, in which.

DETAILED DESCRIPTION OF THE PREFERRED EMBODIMENTS

Figure 1:
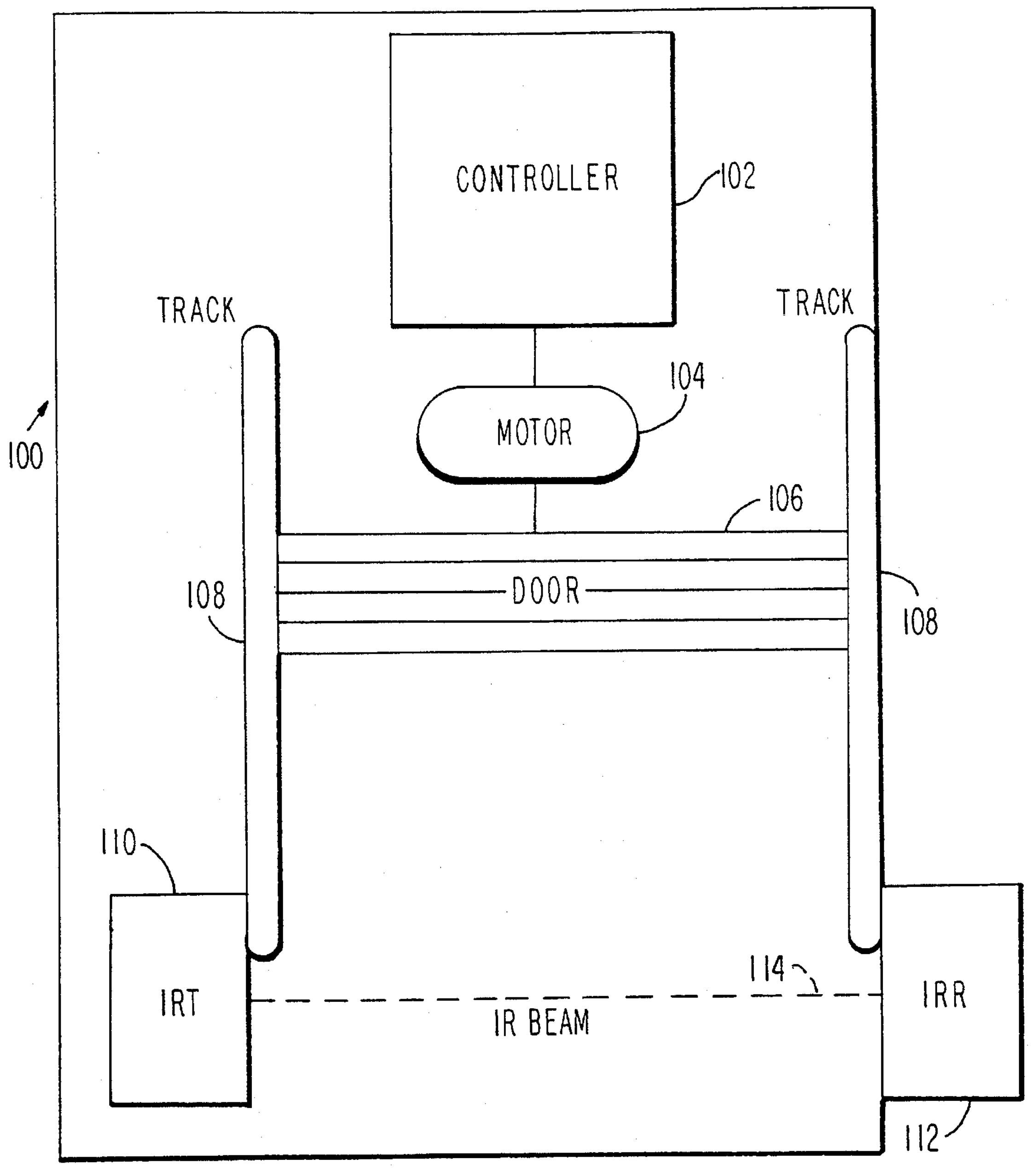
FIG. 1 is a diagrammatic system overview showing the system components in block form.

Reference is now made to the figures, wherein FIG. 1 is a schematic representation of the wireless safety system for a garage door opener, which is generally indicated at 100. The safety system includes a controller 102, a motor 104, a garage door 106 slidable on tracks 108, an infrared transmitter 110 and an infrared receiver 112.

Controller 102 is the command center of the wireless safety system for the garage door opener. Controller 102 is electrically coupled to motor 104 and motor 104 is coupled to garage door 106. Garage door opener is slidable along tracks 108 and displaceable between an up position and a down position. Infrared transmitter 110 and infrared receiver 112 are in communication via infrared beam 114. The infrared transmitter and infrared receiver are remote from controller 102 however, infrared receiver 112 includes a wireless radio signal transmitter to transmit information to controller 102. The operation of infrared transmitter 110 and infrared receiver 112 will be discussed in more detail below.

Controller 102 generally provides an electronic input to motor 104 which causes motor 104 to physically raise and lower door 106 along tracks 108. Infrared transmitter 110 transmits an infrared beam 114 that is received by infrared receiver 112. Under normal operation, upon receipt of infrared beam 114 by infrared receiver 112, infrared receiver 112 outputs a radio frequency signal to controller 102 to continue moving garage door 106. When the safety beam is interrupted, the transmitter within infrared receiver 112 does not output a radio frequency signal to be received by controller 102. Accordingly, controller 102 causes motor 104 to either stop or reverse direction (open).

Figure 2:
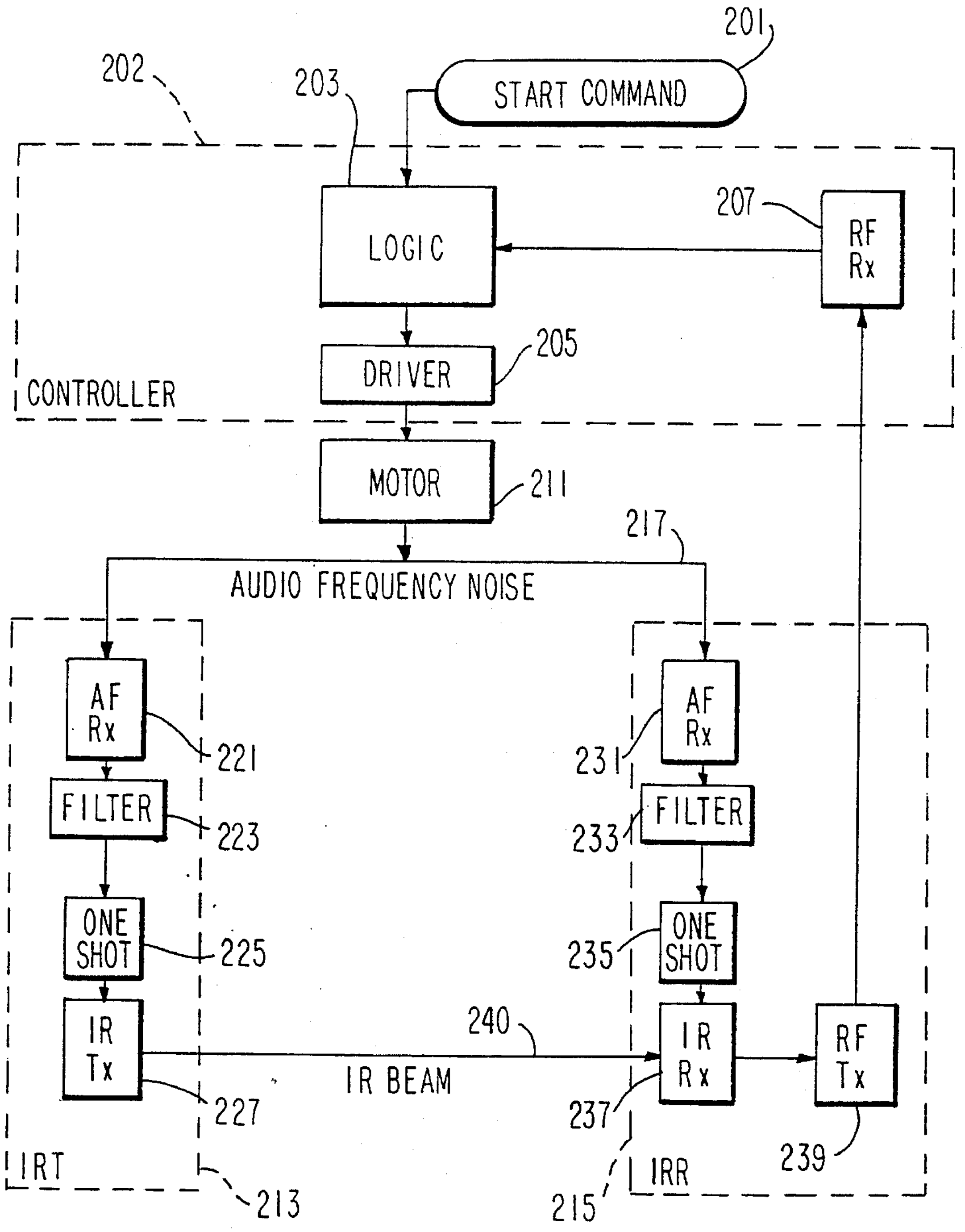
FIG. 2 is a block diagram of the preferred embodiment of the invention.

With particular reference to FIG. 2, a block diagram of the present invention is depicted. A start command 201 is given by an operator via a manual switch or a remote control. This causes a signal to be input into controller unit 202. Controller 202 includes logic 203, driver 205 and RF receiver 207. Controller 202 is electrically connected to motor 211 which is connected to an infrared transmitter assembly 213 and infrared receiver assembly 215 via audio frequency noise 217.

The infrared transmitter assembly 213 is formed of an audio frequency receiver 221, a filter 223, a monostable multivibrator (one shot) 225 and an infrared transmitter 227. The infrared receiver assembly 215 is formed of an audio frequency receiver 231, a filter 233, a monostable multivibrator (one shot) 235, an infrared receiver 237 and a radio frequency transmitter 239.

The start command transmits a pulse to logic block 203. Upon receipt of the first pulse, logic block 203 transmits an ON signal to driver 205. This causes driver 205 to output an appropriate driving current to cause motor 211 to function. As stated above when the motor is operating, it causes door to slide along tracks 108 of FIG. 1. When door 106 slides along tracks 108 an audio frequency noise 217 is created.

Audio frequency receivers 221 and 231 receive audio frequency noise 217 when garage door 106 slides along tracks 108. The audio frequency receivers 221 and 223 are in essence audio frequency transducers that receive audio frequency noise and convert same into electric potential. A voltage or electric potential is output from audio frequency receivers 221, 231 and is input into filters 223, 233. The filters 223, 233 essentially integrate the energy in a predetermined bandwidth and generate an output -assuming the energy input exceeds a preset threshold. The output from filters 223, 233 is input to one shot 225, 235. The one shot is essentially a monostable multivibrator which provides an electric potential for driving the infrared transmitter 227 and infrared receiver 237 for a fixed amount of time. In other words, the one shot may be turned on for a preset period of time, for example 0.1 seconds.

Accordingly, the infrared transmitter 227 and infrared receiver 237 are powered for 0.1 seconds each time the one shot 225, 235 is activated. This causes infrared transmitter 227 to transmit infrared beam 240 that is received by infrared receiver 237. As long as infrared receiver assembly 215 receives audio frequency noise 217 at audio frequency receiver to activate the unit, and receives infrared beam at infrared receiver 237, the infrared receiver will activate radio frequency transmitter 239 to transmit a predetermined radio frequency. Radio frequency receiver 207 of controller 202 receives the radio frequency transmission from radio frequency transmitter 239 of infrared receiver assembly 237. Upon receipt of the radio signal at radio frequency receiver 207, radio frequency receiver 207 transmits a logic pulse to logic 203. This in turn causes logic to continue outputting a positive signal to driver 205, such that driver 205 continues to drive motor 211. Thus, door 106 continues to make noise on tracks and infrared transmitter assembly 213 and infrared receiver assembly 215 continue to be driven. This cycle continues until logic 203 turns off the driver due to the door being completely open or closed, or an obstruction is detected by infrared beam 240.

Figure 3:
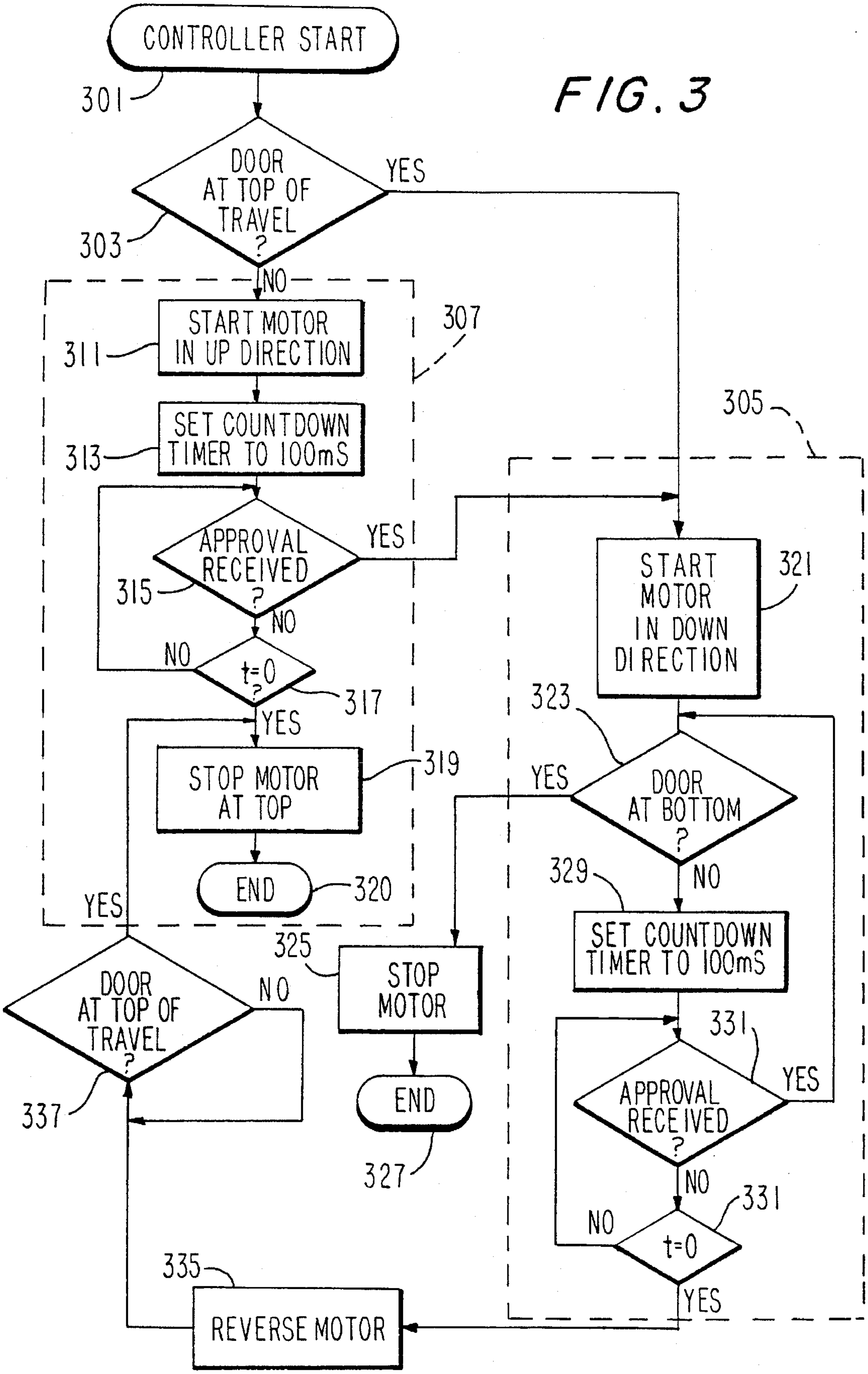
FIG. 3 is a flow diagram of the decision making process of the invention.

Reference is next directed to FIG. 3, which is a flow chart of the logic process of logic 203 of FIG. 2. In particular, this subroutine is for closing the garage door. As a safety feature, when the garage door is stopped at a position that is less than fully open, the garage door will initially move upward rather than down. The advantage to this feature is discussed immediately below.

The process begins at controller start block 301 which is an initialization or power up. It is determined whether the garage door 106 of FIG. 1 is at the top of its travel in step 303. If the door is at the top of its travel, the close door subroutine 305 is initiated. Alternatively, if the door is not at the top of its travel, the door will begin its initial motion in the up direction in accordance with open door subroutine 307. The initial motion in the up direction is prior to the infrared transmitter assembly 213 and infrared receiver assembly 215 being activated. It is desirable to have the safety sensors activated by the motion of the door in the opening direction because if the sensor is blocked, you don't want the door to be moving in the down direction. Accordingly, if the door is less than fully open, it is desirable to have the door moving in the up direction when the sensor is not operating.

The open door subroutine 307 begins at logic step 311, with the motor being initiated in order to move the garage door in the up direction. Logic step 312 sets a countdown timer to 100 milliseconds and the counter begins counting down. Logic step 315 asks the question whether approval has been received. Referring back to FIG. 2, approval is received when radio frequency transmitter 239 transmits a radio signal that is received by radio frequency receiver 207 and radio frequency receiver 207 inputs a signal to logic 203. The signal transmitted to logic 203 is the approval signal. Referring back to FIG. 3, if no approval signal is received logic step 317 is performed and it is determined whether the time from the countdown timer in logic step 313 equals zero. If the time does not equal zero, then the logic returns to logic step 316 to determine whether the approval has been received. Alternatively, if the time equals zero then the motor is stopped at the top in logic step 319 and the program is terminated at logic step 320. In other words, door 106 of FIG. 1 moves upward along tracks 108 of FIG. 1 until infrared transmitter assembly 213 and infrared receiver assembly 215 wake up and transmit approval, or in the alternative if no approval is received within 100 milliseconds the program is terminated.

If the door is at the top of travel at step 303, or if approval is received in step 315 then close door subroutine 305 is initiated. An input pulse indicating to start the subroutine is input at logic block 321 which starts the motor in the down direction. The question is next asked whether the door is at the bottom of its swing in logic block 323. If the door is at the bottom of its swing, the motor is terminated in step 325 and the program ends in step 327. Alternatively, if the door is not at the bottom of its swing in logic block 323, a countdown timer is set to 100 milliseconds in logic step 329. In logic block 331 the question is asked whether approval has been received. This is the same approval noted above with regard to logic block 315. If approval has been received then the logic is returned to step 323 and continues back as described above. Alternatively, if approval has not been received, logic step 333 asks whether the timer equals zero. This timer is the one set to 100 milliseconds in logic block 329. If time does not equal zero instep 333, the logic is returned to step 331 to check whether approval has been received again. This continues until time equals zero or approval is received. Accordingly, for the door 106 of FIG. 3 to move efficiently down tracks 108, approval should be received more often than once every 100 milliseconds. If this is accomplished, then the motor will continuously run until the door is at the bottom as logic step 323 asks. Upon a yes answer indicating that the door is at the bottom, the motor will stop automatically at logic step 325.

Alternatively, if logic step 333 receives a yes answer that the time equals zero and no approval was received in the last 100 milliseconds, then it is assumed that an obstruction exists between infrared transmitter assembly 213 and infrared receiver assembly 215 of FIG. 2. Accordingly, the motor would be reversed in step 335 and logic step 337 asks whether the door is at the top of travel. If the door is not at the top of the travel a continuous loop is started by 337 that will continue to loop until a yes answer is received. Once the door is at the top of the travel, a yes response is given in step 337, and the motor is stopped at the top of the tracks in logic step 319, and the program is terminated at logic block 320.

Accordingly, it can be seen that FIG. 3 contemplates a logic block for initiating the controller unit, wherein the close door portion of the subroutine is entered. If an obstruction is detected between the infrared transmitter assembly 213 and the infrared receiver assembly 215, the door automatically stops moving in the down direction within 100 milliseconds. As stated above, the preferred embodiment contemplates stopping the door during the up routine in a position prior to being completely open, so that the answer in logic block 303 is no and the motor can start in the up direction in logic block 311. In this way, the infrared transmitter assembly 213 and infrared receiver assembly 215 of FIG. 2 can be activated by audio frequency noise 217 of the door 106 moving along tracks 108 of FIG. 1. Accordingly, then once approval is received in logic block 315 of FIG. 3, the motor can be initiated to the down direction in logic block 321 in order to start the close door subroutine 305. In this way it can not be said that there is any danger in the door moving in the down direction for any period when the infrared transmitter and receiver assemblies 213, 215 are in the dormant state.

The aforenoted detailed description of the preferred embodiment discloses one manner in which the system operates. In an alternative embodiment, the infrared transmitter assembly 213 and infrared receiver assembly 215 can be activated by radio frequency receivers that receive a radio frequency signal from controller 202. In this way, the audio frequency noise would not be sensed and alternatively, the infrared transmitter assembly 213 and infrared receiver assembly 215 would include radio frequency receivers instead of audio frequency receivers. This is one alternative embodiment for accomplishing the same result of providing an infrared transmitter assembly and infrared receiver assembly that can wirelessly be coupled to the controller unit. A second alternative embodiment could include sending an infrared signal to wake up the detection elements. This would simply include having an infrared receiver located in both detection elements. These alternative methods of saving battery life by providing the detection elements (infrared transmitter assembly 213 and infrared receiver assembly 215) with a dormant state and an active state are less desirable ways of performing the same function as the preferred embodiment, because the alternative embodiments consume more battery life while in the dormant state.

Accordingly, it can be seen that a large advantage is provided by having such a wireless safety system for a garage door opener because the end user, or person installing such a system would not be required to connect complex wires between the controller unit at one end and the infrared (the transmitter and receiver) at the end. Furthermore, each unit can be self contained and does not require plugs or connectors or wires that can often crimp, corrode or deteriorate.

As stated hereinabove, the approval signal provided by the infrared receiver assembly 215 to the radio frequency receiver 207 of controller unit 202 can be the same receiver that produces the start command 201. In other words, radio frequency receiver 207 can also receive a start pulse from the remote located in a user's automobile. This may be accomplished by the radio frequency receiver 207 receiving the start pulse and providing the approval signal to logic 203 which starts the operation of the system as described hereinabove.

Another optional enhancement of the present invention is to provide the system with a piezoelectric sensor to power the audio frequency receiver and filter stages of the infrared transmitter assembly 213 and infrared receiver assembly 215. In other words, the energy from the audio noise would be converted to useable electric energy. In so doing, the systems can then be designed using a sealed assembly having lithium batteries therein. This system may provide approximately a five year useful life (based on normal average use) and the lithium batteries will only power the infrared transmitter 227 to produce infrared beam 240 and the radio frequency transmitter 239, to produce the approval signal.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language might be said to fall therebetween.

What is claimed is:

1. A garage door operating system having a wireless safety system, comprising:

means for controlling movement of said garage door;

activation means for providing an input to said controlling means to initiate motion of said garage door along a path; and means for detecting whether an obstruction is provided in the path of said garage door;

said detection means operating in a first state at a low power level insufficient to detect obstructions, and operating in a second state at a higher power level sufficient to detect obstructions; and said detection means being selectively switchable between said first state and said second state by said controlling means.

2. The wireless safety system of claim 1, wherein said system includes tracks for guiding said garage door.

3. The wireless safety system of claim 2, wherein said detection means receives a signal from said controlling means which is transmitted over said tracks to switch said detection means between said first state and said second state.

4. The wireless safety system of claim 3, wherein said signal is vibration of the tracks.

5. The wireless safety system of claim 3, wherein said signal is a sound wave radiating from said tracks.

6. The wireless safety system of claim 1, wherein a transducer is used to sense vibration of the track and selectively switch said detection means from said first state to said second state.

7. The wireless safety system of claim 1, wherein said detection means is switchable from said first state to said second state by sound waves emitted by movement of said garage door.

8. The wireless safety system of claim 7, further including an audio frequency receiving means for receiving the sound emitted by the movement of the garage door and generating a voltage.

9. The wireless safety system of claim 8, further including filter means for receiving said voltage output from said audio frequency receiving means and outputting a filtered signal in response thereto.

10. The wireless safety system of claim 9, further including means for generating an output for a duration in response to said filtered signal received from said filter means.

11. The wireless safety system of claim 10, wherein said generating means is a monostable multivibrator.

12. The wireless safety system of claim 10, wherein the electric power to drive the audio frequency receiving means is generated by a piezoelectric transducer.

13. The wireless safety system of claim 10, further including infrared transmitter means coupled to said generating means, said infrared transmitter means being initiated by said output pulse of said generating means.

14. The wireless safety system of claim 13, further including infrared receiver means coupled to said generating means, said infrared transmitter means being initiated by said output pulse of said generating means.

15. The wireless safety system of claim 14, wherein said infrared receiver means transmits a control signal to said controlling means after receiving a signal from said infrared transmitter means.

16. The wireless safety system of claim 10, further including infrared receiver means coupled to said generating means, said infrared receiver means being initiated by said output pulse of said generating means.

17. The wireless safety system of claim 1, wherein said controlling means includes a radio frequency transmitter, said radio frequency transmitter selectively transmitting a signal to selectively switch said detection means from said first state to said second state.

18. The wireless safety system of claim 1, wherein said controlling means includes an infrared transmitter, said infrared transmitter selectively transmitting a signal to selectively switch said detection means from said first state to said second state.

19. The wireless safety system of claim 1, wherein said activation means includes a radio frequency transmitter and said controlling means includes a radio frequency receiver; said radio frequency receiver of said controlling means responding to said radio frequency transmitter of said activation means to initiate motion of said garage door.

20. The wireless safety system of claim 19, wherein said detection means includes a radio frequency transmitter for providing an approval signal to said controlling means when no obstruction is detected by said detection means.

21. The wireless safety system of claim 20, wherein said radio frequency transmitter of said detection means and said radio frequency transmitter of said activation means both transmit a radio signal to the same radio frequency receiver in said controlling means.

22. The wireless safety system of claim 1, wherein the detection means includes infrared transmitter means and infrared receiver means, said infrared transmitter and infrared receiver means being selectively switchable between a first state, wherein said infrared transmitter means does not transmit an infrared beam and said infrared receiving means does not receive an infrared beam, and operates at a low power level, and a second state, wherein said infrared transmitter means and infrared receiver means detect obstructions by transmitting an infrared beam and receiving an infrared beam and work at a higher power level.

23. The wireless safety system of claim 22, wherein said infrared transmitter means is automatically switched from said first state to said second state by the activation of said controlling means.

24. The wireless safety system of claim 23, wherein the infrared receiver means is selectively switched from said first state to said second state by the transmission of an infrared beam from said infrared transmitter means.

25. The wireless safety system of claim 22, wherein said infrared receiver means is selectively switched from said first state to said second state by the receipt of an infrared beam from said infrared transmitter means.

26. A garage door operating system having a wireless safety system, comprising:

means for controlling movement of said garage door;

activation means for providing an input to said controlling means to initiate motion of said garage door along a path; and means for detecting whether an obstruction is provided in the path of said garage door;

said detection means functioning at a first power level wherein said detection means does not detect obstructions, and a second power level which is higher than said first power level and wherein said detection means detects obstructions; and said detection means being selectively switchable between said first power level and said second power level by said controlling means.

27. The system of claim 26, wherein said detection means includes means for transmitting radiant energy.

28. The system of claim 27, wherein no radiant energy is transmitted when said detection means functions at said first power level, and radiant energy is transmitted when said detection means functions at said second power level.

* * * * *